May 5, 1959  S. F. JACKES ET AL  2,884,899
FEEDING DEVICE FOR POULTRY
Filed April 25, 1957
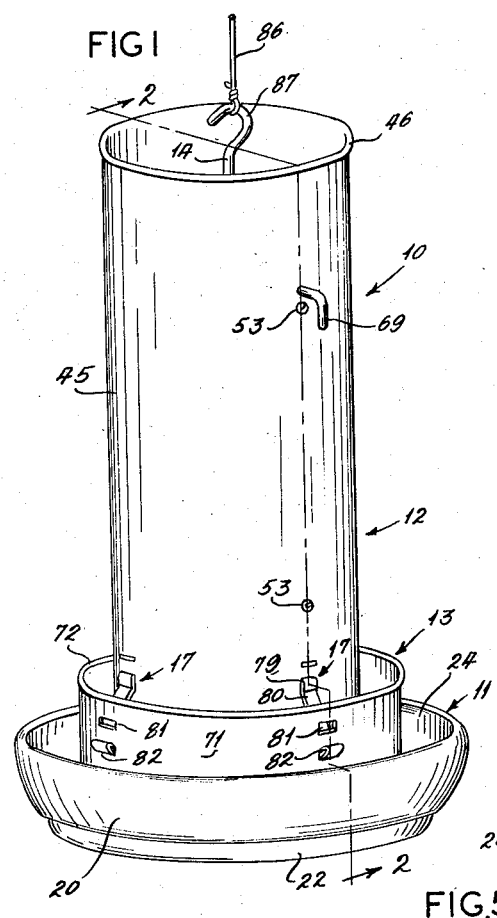
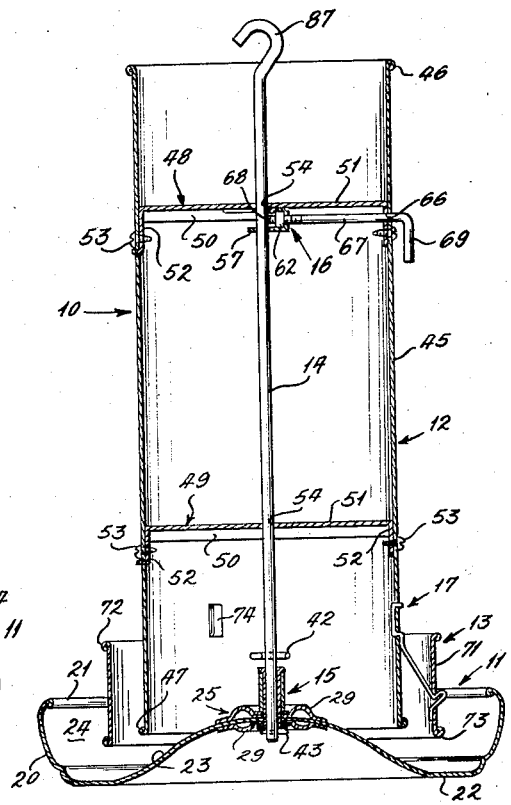
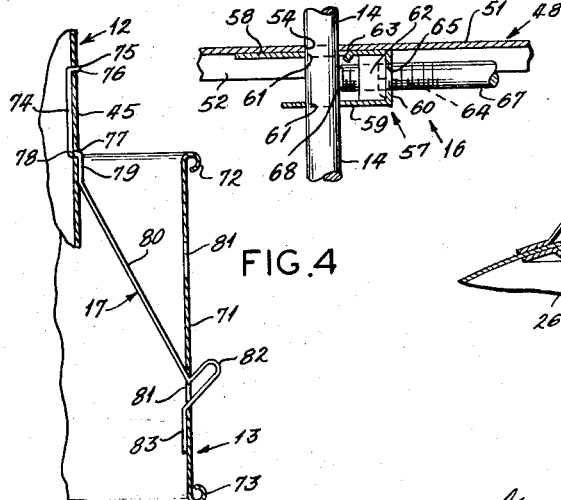
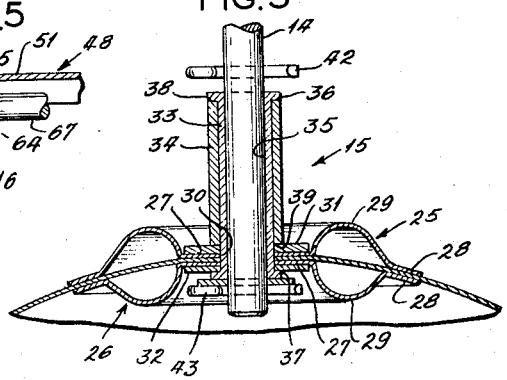
INVENTORS:
STANLEY F. JACKES
SALVATORE STRANO
By Gravely, Lieder, Woodruff & Wills
ATTORNEYS.

United States Patent Office 2,884,899
Patented May 5, 1959

2,884,899

FEEDING DEVICE FOR POULTRY

Stanley F. Jackes, University City, and Salvatore Strano, St. Louis, Mo., assignors to Jackes-Evans Manufacturing Company, St. Louis, Mo., a corporation of Missouri Application April 25, 1957, Serial No. 655,114

3 Claims. (Cl. 119—53)

This invention relates generally to improvements in feeding devices and more particularly to a novel feeder for poultry.

The principle of operation of the present feeder device is well known, but the prior art constructions have had an assembly of parts that are difficult to maintain in adjusted positions or assembly, which parts have also been unsturdy and easily dented or otherwise damaged.

The objects of the present invention are to provide an improved feeder device that is sturdy in construction, easily assembled and adjusted and economical to manufacture. Other objects and advantages will become apparent hereinafter.

Briefly, the present invention comprises a feeder device having a base, a tubular member adjustably mounted on a rod member journaled in the base, a collar adjustably mounted on the tubular member, means for locking the tubular member in adjusted position on the rod member, and means for resisting forces tending to bend the connection between the rod member and the base.

The invention also consists in the parts and in the arrangements and combinations of parts hereinafter described and claimed. In the accompanying drawing which forms a part of this specification and wherein like numerals refer to like parts wherever they occur:

Fig. 1 is a perspective view of a feeding device embodying the present invention, Fig. 2 is a vertical cross-sectional view of the feeder taken along line 2—2 of Fig. 1, Fig. 3 is an enlarged fragmentary sectional view showing a bearing assembly for mounting the rod member on the base and the strengthening means for the latter, Fig. 4 is an enlarged fragmentary sectional view of the collar mounting means, and Fig. 5 is an enlarged fragmentary view partly in section of the locking assembly for mounting the cylinder on the rod member.

Referring now to the drawings, it will be seen that a feeder 10 embodying the present invention comprises a base or feeder pan 11, a tubular member or feed reservoir 12 and a collar or guard 13. A rod member 14 is rotatably secured to the base 11 by a novel bearing assembly 15 (Fig. 3), the tubular member 12 is mounted on the rod member 14 by a locking assembly 16 (Fig. 5) providing for vertical adjustment of the tubular member 12 relative to the base 11, and the collar 13 is adjustably secured to the tubular member 12 by a novel clip or mounting means 17 (Fig. 4). The base 11, tubular member 12 and collar 13 may be of any suitable shape, members circular in cross-section being shown for purposes of disclosure. Accordingly, the tubular member will be referred to hereinafter as the cylinder 12.

The base 11 is preferably cup-shaped having an annular side wall 20 arcuate in cross-section and having a beaded upper rim 21, and a bottom wall 22 with a convex central portion 23 forming a central mound so that the side and bottom walls 20 and 22 define an annular trough 24 in which feed is placed. As shown best in Fig. 3, the base 11 also includes strengthening means comprising upper and lower plates 25 and 26, each of which has a central portion 27 and a peripheral portion 28 complementary to the curvature of the convex portion 23 of the bottom wall 22. Each of the upper and lower plates 25 and 26 also has an annular arcuate channel-shaped portion 29 intermediate the central and peripheral portions thereof. The plates 25 and 26 are mounted at the center of the convex portion 23 of the bottom wall 22 with the portion 29 of the upper plate 25 forming an upwardly extending annular ridge and the portion 29 of the lower plate 26 forming a downwardly extending annular ridge. A central opening 30 is formed through the central portions 27 of the plates 25 and 26 and through the bottom wall 22.

The bearing assembly 15 includes washers 31 and 32 positioned in abutting position with the central portions 27 of the upper and lower plates 25 and 26, respectively, and inner and outer sleeve members 33 and 34. The bore 35 of the inner sleeve 33 forms the bearing surface for the rod member 14, and the inner sleeve has flanged upper and lower ends 36 and 37. The outer sleeve 34 encloses the inner sleeve 33, and has an upper end 38 in abutment with the upper flange 36 and a lower end 39 in abutment with the upper washer 31. The inner sleeve 33 extends through the openings in the washers and the opening 30, and the lower flange 37 is in abutment with the lower washer 32. Accordingly, the parts of the bearing assembly 15 are rigidly secured together and maintain the strengthening means in supporting contact with the convex portion 23 of the bottom wall 22. The lower end of the rod member 14 has spaced cross pins 42 and 43 or the like forming stops on each side of the bearing assembly 15 for limiting axial movement of the rod member 14 relative thereto.

The cylinder 12 includes a tubular body portion or wall 45 having upper and lower beaded rims 46 and 47, and channel-shaped upper and lower cross bars 48 and 49 that are secured to the tubular wall 45 in vertically spaced relation with each other and with the rims 46 and 47. Each of the cross bars 48 and 49 has side walls 50 and a top wall 51, the ends of the top wall 51 being turned downwardly to form flanges 52 that are secured to the wall 45 of the cylinder 12 in any suitable manner, such as by screws 53. An opening 54 is formed in the top wall 51 of each cross bar through which the rod member 14 slidably extends.

The cylinder 12 is movable axially relative to the rod member 14, and the locking assembly 16 is provided for securing the cylinder in adjusted position on the rod member. As shown best in Figs. 2 and 5, the locking assembly 16 is associated with the upper cross bar 48 and comprises a U-shaped bracket member 57 having a wall 58 secured to the top wall 51 of the upper cross bar 48 and a wall 59 spaced from the wall 58 by a base wall 60. The walls 58 and 59 have openings 61 aligned with the opening 54 in the cross bar 48 and through which the rod member 14 extends. A nut 62 is retained in the bracket member 57 by a tab 63 struck from the wall 58 and side flanges 64 formed on the base wall 60, the base wall 60 having an opening 65 in alignment with the threaded bore of the nut 62. An opening 66 is also formed in the flange 52 and wall 45 of the cylinder 12 in alignment with the bore of the nut 62, and a shaft 67 extends through the openings 65 and 66 and has an end 68 threadedly received in the bore of the nut 62. The other end of the shaft 67 forms a handle 69 positioned on the exterior of the cylinder 12. It is apparent that the shaft 67 may be rotated in the nut to move the end 68 into locking abutment with the rod member 14 whereby the cylinder and rod member will be locked together.

Referring to Figs. 1, 2 and 4, the collar 13 forms a sleeve wall 71 in spaced relation with the lower end of the cylinder 12, the collar having beaded upper and lower rims 72 and 73. The collar is mounted on the cylinder by a plurality of the clips 17. Each of the clips 17 includes a cylinder attaching end having an inner vertical wall portion 74 adapted to be positioned against the interior surface of the cylinder 12, an upper tab 75 formed on the upper end of the wall portion 74 and adapted to extend through an upper slot 76 in the cylinder 12, a lower tab 77 connected to the lower end of the wall portion 74 and adapted to extend through a lower slot 78 in the cylinder 12, and an outer vertical wall portion 79 connected to the tab 77 and adapted to abut the outer surface of the cylinder 12. Each of the clips also has a collar attaching end connected to the cylinder attaching end by an angularly downwardly-extending connecting wall or strip 80, the collar attaching end being adapted to be removably engaged in one of vertically aligned spaced openings 81 formed in the collar 13. The collar attaching end of each of the clips 17 comprises a U-shaped or loop portion 82 extending angularly upwardly from the connecting wall 80 so that the juncture thereof forms the seat upon which the collar 13 is supported. A vertical tab 83 is connected to the other end of the loop portion 82 and is adapted to abut the interior surface of the sleeve wall 71 of the collar 13.

When the collar 13 mounted on the cylinder 12 by the clips or brackets 17, the weight of the collar maintains the inner and outer wall portions 74 and 79 of the cylinder attaching end of the clips 17 in abutment with the cylinder wall. The connecting wall 80 of each clip 17 is resilient so that the looped portion 82 of the collar attaching end may be depressed through the opening 81 for removing the collar 13 or for adjusting it on the clips 17. As shown best in Fig. 2, the clips 17 extend between the cylinder 12 and the collar 13 and do not obstruct the space or annular feeding area between the collar and the rim 21 of the base.

In operation, the feeder 10 is hung from a suitable support (not shown) by a rope 86 or like means, the upper end of the rod member 14 being provided with a hook 87 or the like for easy attachment of the rope thereto. The height of the feeder 10 is adjusted during growth of the poultry so that feed in the base 11 is just accessible. The cylinder 12 is filled with feed and adjusted by the locking assembly 16 so that the lower end of the cylinder is spaced away from the base 11 so that the rate of feed falling into the annular cavity 24 of the base 11 is regulated, or the cavity 24 may be filled and the lower end of the cylinder 12 moved into contact with the bottom wall 22 of the base 11 so that only a predetermined portion of feed is available for the poultry. The collar 13 may also be adjusted on the clip means 17 so that the space between the lower bead 73 and the bottom wall 22 of the base 11 regulates the flow of feed from the cylinder 12 into the base cavity 24. The collar 13 also acts as a guard for preventing the poultry from standing in the feed, the collar 31 being spaced a predetermined distance from the cylinder 12 so that it is also difficult for the poultry to stand on the collar.

The bearing assembly 15 assures that the base 11 is rotatable relative to the cylinder 12 so that glancing blows or forces exerted on the base 11 are dissipated by rotation rather than bending of the rod member 14 or the bottom wall 22 of the base 11. The novel strengthening means also resist direct bending forces exerted on the base 11 that would tend to cause a bending of its bottom wall 22 about the point that the rod member 14 is secured thereto.

It is to be understood that the foregoing descripion and accompanying drawing have been given only by way of illustration and example, and that changes and modifications in the present disclosure, which will be readily apparent to all skilled in the art, are contemplated as within the spirit and scope of the present invention, which is limited only by the claims which follow.

What we claim is:

1. In a feeder for poultry and the like having a feed containing base having side and bottom walls, and a rod member rotatably mounted in the bottom wall of said base and supporting a tubular feed reservoir above said base; bearing and strengthening means for rotatably mounting said rod member in said base, said strengthening means comprising upper and lower plates having central and peripheral portions abutting the bottom wall of said base and annular channel-shaped portions intermediate said central and peripheral portions, and an opening formed through the central portions of said plates and said bottom wall, said bearing means comprising upper and lower washer members in surface abutment with the central portions of said plates and having openings in registry with the opening therethrough, and inner and outer sleeve members, the inner sleeve member extending through said openings and having a lower end flange in abutment with said lower washer member and an upper end flange spaced from said upper washer member, said outer sleeve member being positioned in circumscribing relation with said inner sleeve member and having upper and lower ends rigidly secured between said upper washer member and the upper end flange of said inner sleeve member, the bore of said inner sleeve member forming a bearing surface in which the lower end of said rod member is journaled, and spaced stop means on said rod member limiting axial movement of the rod member relative to said bearing means.

2. A feeder of the type described comprising a base having side and bottom walls defining an annular trough, said bottom wall having a convex portion; strengthening means including upper and lower plates having central and peripheral wall portions in abutment with the convex portion of said bottom wall, and annular channel-shaped wall portions forming continuous ridges above and below said bottom wall; a bearing assembly including upper and lower washer members in surface abutment with the central portions of said upper and lower plates and bottom wall in registry with the openings in said washers, and inner and outer sleeves, said inner sleeve having flanged ends securing said outer sleeve, washers, plates and bottom wall in rigid abutment; a rod member having a lower end rotatably mounted in said bearing assembly; a cylindrical member having spaced cross bars with openings through which said rod member extends; a locking assembly associated with one of said cross bars and including a bracket secured to said one cross bar, a nut secured adjacent to said rod member by said bracket, and a shaft having one end threadedly received in said nut and the other end forming a handle outside said cylindrical member, said shaft being rotatable into and out of locking engagement with said rod member, said cylindrical member being adapted to slide vertically on said rod member relative to said base and said locking assembly being adapted to releasably secure said cylindrical member in fixed position on said rod member; a collar adjustably and releasably mounted in spaced circumscribing relation with the lower end of said cylindrical member; and clip means for mounting said collar on said cylindrical member, said clip means including spaced clips each of which has a cylindrical member attaching end having inner and outer wall abutment portions and a collar attaching end having a U-shaped portion and an inner collar wall abutment tab, said cylindrical member and collar attaching ends being connected by an angularly extending resilient connecting wall, and said U-shaped portion being adapted to extend angularly upwardly through one of the spaced vertically aligned openings in said collar.

3. In a feeder for poultry and the like having a feed containing base having side and bottom walls defining an annular trough, said bottom wall including a spherical central portion; upper and lower strengthening means having a peripheral portion secured to the central portion of said bottom wall and a portion extending away from the bottom wall, aligned openings formed in the upper and lower strengthening means and central portion of the bottom wall; a rod member having a lower end rotatably mounted in the aligned openings; a cylindrical member having spaced cross bars with openings through which said rod member extends; a locking assembly associated with one of said cross bars and including a bracket secured to said one cross bar, a nut secured adjacent to said rod member by said bracket, and a shaft having one end threadedly received in said nut and the other end forming a handle outside said cylindrical member, said shaft being rotatable into and out of locking engagement with said rod member, said cylindrical member being adapted to slide vertically on said rod member relative to said base and said locking assembly being adapted to releasably secure said cylindrical member in fixed position on said rod member; a collar adjustably and releasably mounted in spaced circumscribing relation with the lower end of said cylindrical member; and clip means for mounting said collar on said cylindrical member, said clip means including spaced clips each of which has a cylindrical member attaching end having inner and outer wall abutment portions and a collar attaching end having a U-shaped portion and an inner collar wall abutment tab, said cylindrical member and collar attaching ends being connected by an angularly extending resilient connecting wall, and said U-shaped portion being adapted to extend angularly upwardly through one of the spaced vertically aligned openings in said collar.

References Cited in the file of this patent

UNITED STATES PATENTS

| | | |
|---|---|---|
| 1,699,501 | McCartney | Jan. 15, 1929 |
| 2,429,777 | Smith | Oct. 28, 1947 |
| 2,438,080 | Van Meeteren | Mar. 16, 1948 |
| 2,515,698 | Cosby | July 18, 1950 |
| 2,522,634 | Pittenger | Sept. 19, 1950 |
| 2,709,417 | Brembeck | May 31, 1955 |
| 2,721,537 | Miller | Oct. 25, 1955 |
| 2,789,534 | Landgraf | Apr. 23, 1957 |
| 2,796,848 | Zimmerman | June 25, 1957 |
| 2,826,171 | Piel | Mar. 11, 1958 |